United States Patent [19]

Kameda

[11] Patent Number: 5,008,222

[45] Date of Patent: Apr. 16, 1991

[54] ALUMINUM TITANATE CERAMIC SINTERED BODY

[75] Inventor: Tsuneji Kameda, Kanagawa, Japan

[73] Assignee: Kabushiki Kaisha Toshiba, Kawasaki, Japan

[21] Appl. No.: 330,920

[22] Filed: Mar. 31, 1989

[30] Foreign Application Priority Data

Mar. 31, 1988 [JP] Japan .................................. 63-76130

[51] Int. Cl.⁵ .............................................. C04B 35/46
[52] U.S. Cl. ..................................... 501/134; 501/127; 501/128; 501/135; 501/136
[58] Field of Search ............... 501/134, 135, 136, 127, 501/128

[56] References Cited

U.S. PATENT DOCUMENTS 4,430,440  2/1984  Wada et al. ........................ 501/134

FOREIGN PATENT DOCUMENTS

| 2509765 | 9/1976 | Fed. Rep. of Germany | 501/134 |
| 2750290 | 5/1979 | Fed. Rep. of Germany | 501/134 |
| 3534149 | 1/1987 | Fed. Rep. of Germany | 501/134 |
| 52-023113 | 2/1977 | Japan | 501/134 |
| 57-003767 | 1/1982 | Japan | 501/134 |
| 60-046970 | 3/1985 | Japan | 501/134 |

*Primary Examiner*—Mark L. Bell
*Assistant Examiner*—Anthony J. Green
*Attorney, Agent, or Firm*—Foley & Lardner

[57] ABSTRACT

A ceramic sintered body having a Young's Modulus of not less than 1,600 kg/mm$^2$ produced by sintering 1 to 10 weight % of magnesium oxide, 0.5 to 10 weight % of silicon oxide, the remainder being substantially aluminum titanate.

9 Claims, No Drawings

ALUMINUM TITANATE CERAMIC SINTERED BODY

BACKGROUND OF THE INVENTION

This invention relates to a ceramic sintered body having excellent strength and showing little change of dimensions produced by thermal treatment, and having a high melting point and a low thermal expansion. Especially, this invention relates to a ceramic sintered body for structural uses, e.g. as a portliner for an internal combustion engine.

Aluminum titanate is a specific ceramic having a high melting point and showing a low thermal expansion. Because of these characteristics, attempts have been made to utilize it practically. However, it is subject to the problem that its mechanical strength is low, since it is difficult to obtain a fine sintered body, and it is also subject to thermal instability in that it undergoes thermal cracking when heated up to 1250° C. Also, thermal expansion and contraction of the sintered body are affected by the thermal treatment history, and its strength is very adversely affected by repeated heating and cooling.

This thermal treatment effect is the result of the aluminum titanate crystals having anisotropic thermal expansion characteristics, with the result that fine cracks are produced in the sintered body by a thermal treatment history of cooling after heating, thereby adversely affecting the strength of the sintered body. This formation of cracks on cooling occurs every time the ceramic sintered body is subjected to heating and cooling after sintering. It therefore causes problems of loss of strength and dimensional stability, particularly in cases where the sintered body is subjected to a cyclical heat treatment.

Various additives have been introduced in attempts to ameliorate these difficulties of aluminum titanate. For example, published Japanese Patent No. SHO.56-7996 discloses low thermal expansion ceramics containing 0.05 to 10.0 weight % of at least one of silicon and zirconium, calculated as $SiO_2$ and $ZrO_2$, with respect to the aluminum titanate. It is stated that by the introduction of prescribed contents of silicon and zirconium into this ceramic, grain growth is controlled, resulting in a ceramic which is thermally stable and which shows little strength deterioration after a history of thermal treatment.

The Journal of the Chemical Society of Japan (Nippon Kagaku Kaishi) (1981 No. 10) pages 1647 to 1655 reports the effects of various additives under the title "Effect of additives on the properties of aluminum titanate sintered bodies". This report describes the results of attempts to improve the cracking resistance in the low temperature region by blending in additives in order to suppress the growth of aluminum titanate crystals, while promoting sintering, increasing the mechanical strength and maintaining an apparent low thermal expansion. The additives investigated were $Li_2O$, $B_2O_3$, $SiO_2$, $MgO$, $Cr_2O_3$, $Fe_2O_3$, and $ZrO_2$. The effect of these additives is examined and summarized. Whereas $MgO$, $Fe_2O_3$ and $ZrO_2$ have the effect of increasing the density of the sintered body, $Cr_2O_3$ does not necessarily increase the density. Also, although $Li_2O$ and $B_2O_3$ showed an effect of promoting increased fineness, $SiO_2$ showed a sintering promoting effect.

Furthermore, published Japanese Patent No. SHO.62-32155 discloses a composite with metal incorporating a ceramic material obtained by sintering a raw material whose chemical composition is: 50 to 60 weight % $Al_2O_3$, 40 to 45 weight % $TiO_2$, 2 to 5 weight % kaolin (corresponding to $Al_2O_3.2SiO_2$), and 0.1 to 1 weight % magnesium silicate, and having a particle size less than 0.6 micron. This patent document suggests that the thermal and mechanical properties of the aluminum titanate are improved by using a combination of aluminum silicate-containing and magnesium silicate-containing additives.

Although in such ceramic sintered bodies, various properties of the aluminum titanate are improved, for practical use there remains a need for aluminium titanate ceramics exhibiting even greater improvements in properties such as strength and thermal variation in length. For example, although it would appear that the combination of sintering adjuvants of the above-mentioned published Japanese Patent No. SHO.62-32155 is desirable, experience has shown that it is extremely difficult to obtain ceramic bodies exhibiting uniformly satisfactory strength and thermal expansion characteristics with the form of starting materials and additive contents set out in Japanese Patent No. SHO.62-32155.

SUMMARY OF THE INVENTION

It is therefore the object of the present invention to provide an aluminum titanate ceramic sintered body that has high strength, and wherein the deterioration of mechanical strength produced by a cyclic thermal treatment history is slight, without impairing the high melting point and low thermal expansion properties possessed by aluminum titanate.

With regard to strength, the value of three point bending strength is preferred to be no less than 2.5 kg/mm$^2$, preferably no less than 3.0 kg/mm$^2$, most preferably no less than 3.5 kg/mm$^2$. The value of the Young's Modulus is preferred to be no less than 1600 kg/mm$^2$, preferably more than 2000 kg/mm$^2$. With regard to the thermal variation in length on cyclic heat treatment, the value of the thermal variation in length is preferred to be less than 0.33%, most preferably less than 0.25%.

These objects are achieved by providing a ceramic sintered body produced by sintering 1 to 10 weight % of magnesium oxide (MgO), and 0.5 to 10 weight % of silicon oxide ($SiO_2$), the balance being substantially aluminum titanate.

DETAILED DESCRIPTION OF THE PREFERRED EMBODIMENTS

As a result of repeated investigation of sintering adjuvants of aluminum titanate, the inventors discovered that a ceramic sintered body obtained by sintering aluminum titanate to which prescribed amounts of MgO and $SiO_2$, respectively, had been added had excellent characteristics. Addition of MgO increases the strength of the sintered body, but, if MgO is added on its own, it produces a concomitant increase in the thermal expansion rate of the sintered body. A considerable increase in the strength of the sintered body and a low thermal expansion can be obtained if more than 0.5 weight % $SiO_2$ is added. So far as the effect of addition is concerned, a range up to 10 weight % is desirable. In respect of both of these, the particularly preferred range is from 1 to 6 weight %.

These sintering adjuvants are added to aluminum titanate raw material powder obtained by calcining a mixture of aluminum oxide ($Al_2O_3$) and titanium oxide ($TiO_2$) in the prescribed proportion, and then grinding. The molar ratio of the $Al_2O_3$ and $TiO_2$ is preferably in the range from 1.3:0.7 to 0.8:1.2. Also, the mean particle diameter of the aluminum titanate raw material powder is 0.6 to 8 microns preferably 0.6 to 7 microns. If the powder is fine, a uniform mixture is difficult to obtain.

EXAMPLES 1 THROUGH 6

Two weight % of MgO and 1 weight % of $SiO_2$ were blended with aluminum titanate ($Al_2TiO_5$) raw material wherein the molar ratio of $Al_2O_3$ to $TiO_2$ was 1.1:0.9 and the mean grain size was 2.55 microns. The mixture was then formed at a forming pressure of 1,000 kg/cm², followed by sintering for 2 hours at 1,500° C. The thermal expansion rate, the thermal variation in length, and the strength were determined for the resulting sample (sample number 1). The measured values are shown in the following Table 1 together with the corresponding properties of similarly obtained samples containing different amounts of sintering adjuvants.

The "thermal variation in length" is defined as $(l_{max} - l_{min})/l_0$, expressed as a percentage, where the original length of the sample is $l_0$, its maximum length when heated from 20° C. to 1,000° C. is $l_{max}$, and its minimum length is $l_{min}$.

TABLE 1

| | Sample Number | | | | | |
|---|---|---|---|---|---|---|
| | 1 | 2 | 3 | 4 | 5 | 6 |
| $Al_2TiO_5$ Mean Grain Size (μm) | 2.55 | 2.55 | 2.55 | 2.55 | 2.55 | 8.06 |
| Sintering MgO | 2 | 2 | 2 | 1 | 0 | 0 |
| Adjuvant $SiO_2$ (weight-%) | 1 | 2 | 4 | 4 | 0 | 0 |
| Sintering (C.°) | 1500 | 1500 | 1500 | 1500 | 1500 | 1500 |
| Conditions (hr) | 2 | 2 | 2 | 2 | 2 | 2 |
| Density (g/cm³) | 3.44 | 3.37 | 3.30 | 3.19 | 3.40 | 2.16 |
| Bending strength (kg/mm²) | 5.32 | 4.95 | 5.16 | 3.73 | 1.21 | 0.22 |
| Thermal Expansion Rate 20–1000° C. | $1.11 \times 10^{-6}$ | $0.47 \times 10^{-6}$ | $0.79 \times 10^{-6}$ | $0.98 \times 10^{-6}$ | $0.18 \times 10^{-6}$ | — |
| Thermal variation in length (%) | 0.24 | 0.21 | 0.19 | 0.22 | 0.37 | — |
| Young's Modulus (kg/mm²) | $2.9 \times 10^3$ | $2.8 \times 10^3$ | $2.8 \times 10^3$ | $2.1 \times 10^3$ | $0.5 \times 10^3$ | $0.1 \times 10^3$ |

As can be seen from Table 1, in the case of the embodiments of this invention (sample numbers 1 to 4), the bending strength and Young's modulus were larger and the thermal variation in length was smaller than in the case of the comparative examples (sample numbers 5 and 6).

EXAMPLES 7 THROUGH 22

Sintering was carried out 2 hours at 1,500° C. after forming samples in each case at a forming pressure of 1,000 kg/cm², varying the blending amounts of MgO and $SiO_2$ sintering adjuvants and using aluminum titanate raw material having an $Al_2O_3$:$TiO_2$ molar ratio of 1.1:0.9 ($Al_2TiO_5$), but with different mean grain sizes, obtained by varying the grinding period of the raw material. The three point bending strength, thermal expansion rate (20 to 1,000° C.), thermal variation in length, and Young's Modulus were measured for the resulting samples. The results ar shown in Tables 2 to 5.

TABLE 2

Three Point Bending Strength: (kg/mm²)

| | Adjuvant (wt. %) | | Mean Grain Size (μm) | | | |
|---|---|---|---|---|---|---|
| No. | MgO | $SiO_2$ | 8.06 | 6.54 | 4.29 | 2.55 | 1.54 |
| 7 | 0 | 0 | 0.22 | 0.15 | 1.28 | 1.21 | — |
| 8 | 0 | 1 | 0.54 | 0.60 | 1.24 | 1.88 | — |
| 9 | 0 | 2 | 0.54 | 0.77 | 1.94 | 1.78 | — |
| 10 | 0 | 4 | 0.80 | 1.02 | 1.81 | 2.76 | — |
| 11 | 1 | 0 | 1.33 | 1.90 | 1.64 | 2.93 | — |
| 12 | 2 | 0 | 1.68 | 1.98 | 2.40 | 3.30 | — |
| 13 | 1 | 1 | 2.37 | 3.71 | 4.10 | 3.46 | 5.07 |
| 14 | 1 | 2 | 2.61 | 3.42 | 3.21 | 3.18 | 4.66 |
| 15 | 1 | 4 | 2.77 | 3.06 | 3.42 | 3.73 | 4.79 |
| 16 | 2 | 1 | 3.36 | 3.99 | 5.00 | 5.32 | 5.53 |
| 17 | 2 | 2 | 3.14 | 4.08 | 4.38 | 4.95 | 5.17 |
| 18 | 2 | 4 | 2.48 | 3.30 | 4.31 | 5.16 | 5.24 |
| 19 | 2 | 6 | — | — | — | 4.70 | 5.70 |
| 20 | 4 | 1 | — | — | — | 5.32 | 5.78 |
| 21 | 4 | 2 | — | — | — | 4.83 | 5.51 |
| 22 | 4 | 4 | — | — | — | 4.17 | 4.31 |

TABLE 3

Thermal Expansion Rate: ($\times 10^{-6}$)

| | Adjuvant (wt. %) | | Mean Grain Size (μm) | | |
|---|---|---|---|---|---|
| No. | MgO | $SiO_2$ | 4.29 | 2.55 | 1.54 |
| 7 | 0 | 0 | −1.13 | −0.18 | — |
| 9 | 0 | 2 | — | 0.47 | — |
| 12 | 2 | 0 | — | 1.02 | — |
| 13 | 1 | 1 | — | — | 0.80 |
| 14 | 1 | 2 | — | 0.63 | — |
| 15 | 1 | 4 | — | 0.98 | 1.45 |
| 16 | 2 | 1 | — | 1.11 | 1.30 |
| 17 | 2 | 2 | — | 0.47 | 0.96 |
| 18 | 2 | 4 | 0.63 | 0.79 | 1.30 |
| 19 | 2 | 6 | — | 1.14 | 1.54 |
| 20 | 4 | 1 | — | 1.22 | 1.73 |
| 22 | 4 | 4 | — | 0.73 | 1.19 |

TABLE 4

Thermal Variation in Length: (%)

| | Adjuvant (weight %) | | Mean grain size (μm) | | |
|---|---|---|---|---|---|
| No. | MgO | $SiO_2$ | 4.29 | 2.55 | 1.54 |
| 7 | 0 | 0 | 0.19 | 0.20 | — |
| 9 | 0 | 2 | — | 0.33 | — |
| 12 | 2 | 0 | — | 0.36 | — |
| 13 | 1 | 1 | — | — | 0.26 |
| 14 | 1 | 2 | — | 0.26 | — |
| 15 | 1 | 4 | — | 0.22 | 0.28 |
| 16 | 2 | 1 | — | 0.24 | 0.27 |
| 17 | 2 | 2 | — | 0.21 | 0.25 |
| 18 | 2 | 4 | 0.19 | 0.17 | 0.22 |
| 19 | 2 | 6 | — | 0.20 | 0.22 |

TABLE 4-continued

| No. | Adjuvant (weight %) | | Thermal Variation in Length: (%) Mean grain size (μm) | | |
|---|---|---|---|---|---|
| | MgO | SiO2 | 4.29 | 2.55 | 1.54 |
| 20 | 4 | 1 | — | 0.22 | 0.27 |
| 22 | 4 | 4 | — | 0.22 | 0.29 |

TABLE 5

| No. | Adjuvant (wt. %) | | Young's Modulus: ($\times 10^3$ kg/mm$^2$) Mean grain size (μm) | | | | |
|---|---|---|---|---|---|---|---|
| | MgO | SiO2 | 8.06 | 6.54 | 4.29 | 2.55 | 1.54 |
| 7 | 0 | 0 | 0.1 | 0.1 | 0.6 | 0.5 | — |
| 8 | 0 | 1 | 0.3 | 0.3 | 0.6 | 1.0 | — |
| 9 | 0 | 2 | 0.3 | 0.4 | 1.0 | 1.0 | — |
| 10 | 0 | 4 | 0.3 | 0.5 | 1.0 | 1.5 | — |
| 11 | 1 | 0 | 0.7 | 1.0 | 1.0 | 1.5 | — |
| 12 | 2 | 0 | 0.9 | 1.1 | 1.3 | 1.8 | — |
| 13 | 1 | 1 | 1.3 | 2.0 | 2.2 | 1.9 | 2.7 |
| 14 | 1 | 2 | 1.4 | 1.8 | 1.7 | 1.7 | 2.3 |
| 15 | 1 | 4 | 1.5 | 1.6 | 1.8 | 2.0 | 2.6 |
| 16 | 2 | 1 | 1.8 | 2.1 | 2.7 | 2.9 | 3.0 |
| 17 | 2 | 2 | 1.7 | 2.2 | 2.4 | 2.8 | 2.8 |
| 18 | 2 | 4 | 1.3 | 1.8 | 2.3 | 2.8 | 2.8 |
| 19 | 2 | 6 | — | — | — | 2.5 | 3.0 |
| 20 | 4 | 1 | — | — | — | 2.9 | 3.1 |
| 21 | 4 | 2 | — | — | — | 2.6 | 3.0 |
| 22 | 4 | 4 | — | — | — | 2.2 | 2.3 |

As is clear from Table 2 and Table 5, the embodiments of this invention (sample numbers 13 to 22) showed high strength, high Young's Modulus and, in particular, those embodiments where the mean grain size of the aluminum titanate raw material was less than 7 microns showed superior strength and high Young's Modulus characteristics.

Also, as shown in Table 3 and Table 4, in the embodiments of this invention, the aluminum titanate had excellent low thermal expansion rate and small thermal variation in length characteristics. Thus, as described above, by means of this invention, aluminum titanate ceramic sintered bodies can be obtained that have a high strength and a small thermal variation in length when subjected to cyclic thermal treatment, without impairing the high melting point and low thermal expansion possessed by aluminum titanate.

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with reference to the appended claims and equivalents.

What is claimed is:

1. A ceramic sintered body having a thermal variation in length (L) of less than 0.33% and a Young's Modulus of not less than 1,600 kg/mm$^2$ produced by sintering 1 to 10 weight % of magnesium oxide, 0.5 to 10 weight % of silicon oxide, the remainder being substantially aluminum titanate having a mean particle diameter of from 0.6μm to 8μm, wherein the thermal variation in length is defined as $(l_{max}-l_{min})/l_0$, expressed as a percentage, where the original length of the sample is $l_0$, its maximum length when heated from 20° C. to 1,000° C. is $l_{max}$, and its minimum length is $l_{min}$.

2. A ceramic sintered body according to claim 1 wherein said body is formed from a raw material powder having a mean particle diameter of from 0.6 μm to 7 μm.

3. A ceramic sintered body according to claim 1, wherein the aluminum titanate is a mixture of aluminum oxide and titanium oxide in an $Al_2O_3:TiO_2$ molar ratio of from 1.3:0.7 to 0.8:1.2.

4. A ceramic sintered body according to claim 2, wherein the aluminum titanate is a mixture of aluminum oxide and titanium oxide in an $Al_2O_3:TiO_2$ molar ratio of from 1.3:0.7 to 0.8:1.2.

5. A ceramic sintered body according to claim 1, wherein the Young's Modulus of said body is greater than 2,000 kg/mm$^2$.

6. A ceramic sintered body according to claim 1, wherein the thermal variation in length (L) is less than 0.25%.

7. A ceramic sintered body according to claim 6, wherein the Young's Modulus of said body is greater than 2,000 kg/mm$^2$.

8. A ceramic sintered body according to claim 1, wherein said body has a three point bending strength of at least 2.5 kg/mm$^2$.

9. A ceramic sintered body according to claim 8, wherein said body has a three point bending strength of at least 3.0 kg/mm$^2$.

* * * * *